July 29, 1947.  G. H. DOWTY  2,424,926
EMERGENCY EXTENSION MECHANISM
Original Filed Oct. 12, 1936  2 Sheets-Sheet 1

Inventor
George H. Dowty
By Lacey & Lacey, Attorneys

July 29, 1947.  G. H. DOWTY  2,424,926
EMERGENCY EXTENSION MECHANISM
Original Filed Oct. 12, 1936   2 Sheets-Sheet 2

Inventor
George H. Dowty
By Lacey & Lacey, Attorneys

Patented July 29, 1947

2,424,926

UNITED STATES PATENT OFFICE 2,424,926

EMERGENCY EXTENSION MECHANISM

George Herbert Dowty, Cheltenham, England

Original application October 12, 1936, Serial No. 105,337. Divided and this application July 2, 1942, Serial No. 449,501

4 Claims. (Cl. 244—102)

This invention relates to an improved emergency extension mechanism for quickly extending an aircraft undercarriage upon the failure of the normal means of extension therefor.

This application is a division of my copending application, Serial No. 105,337, filed October 12, 1936, which application resulted in Patent No. 2,288,968, dated July 7, 1942.

One of the principal objects of the invention is to provide an emergency extension mechanism which will, by a single jerk by the pilot upon a strap or cable, release a source of stored, resilient energy for immediately extending an aircraft undercarriage.

Another object of the invention is to provide an emergency extension mechanism which will, after release, require no further attention upon the part of the pilot.

A further object of the invention is to provide mechanism of this character which will be of relatively simple construction and which will be positive in operation.

Still another object of the invention is to provide an emergency extension mechanism which will in no way interfere with the normal means of extension and retraction of the undercarriage.

Further objects of the invention will become apparent during the course of the following description.

Figure 1:
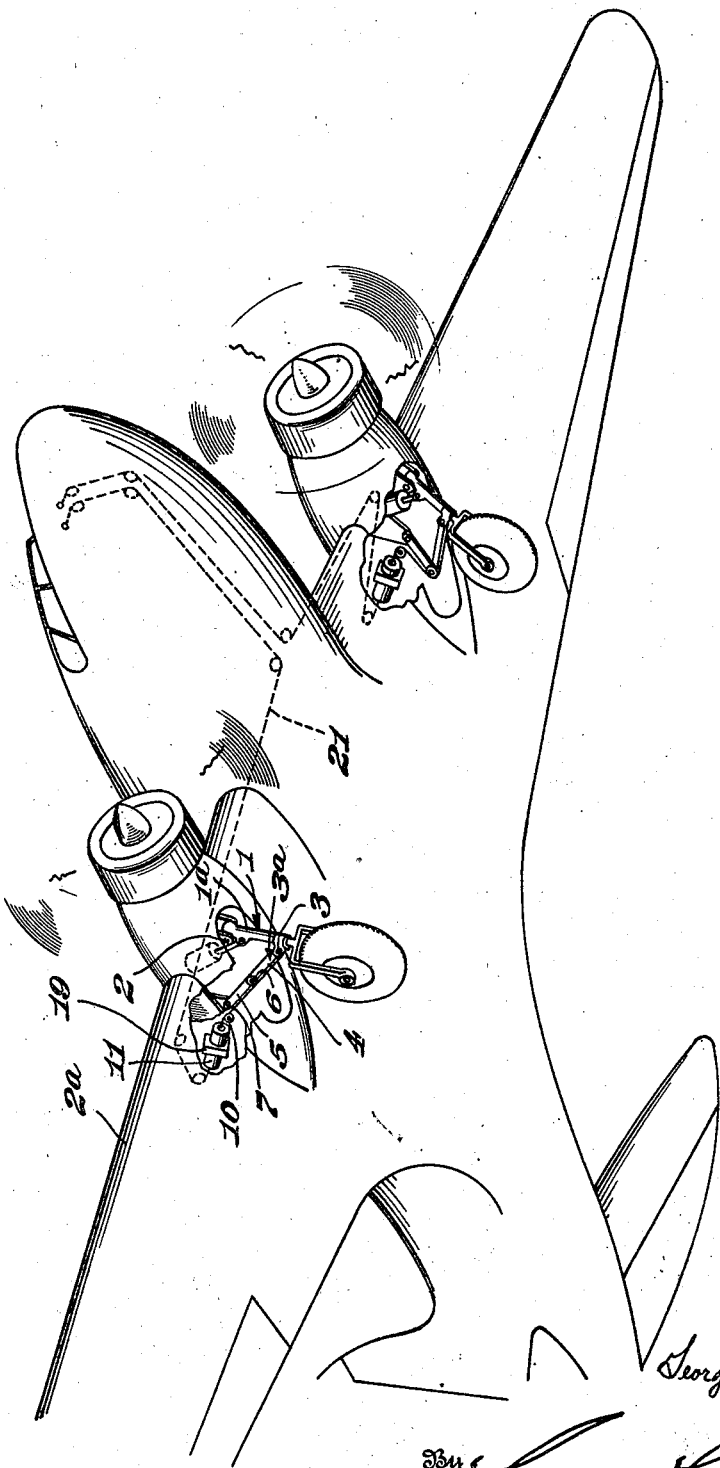
Figure 1 is a perspective view showing my improved emergency extension mechanism as it would appear installed upon an aircraft, the normal means of extension being shown schematically in dotted lines.

A conventional undercarriage is shown at 1 and comprises a wheel carrying leg structure 1a which is pivotally connected, for rearward and upward swinging movement, to a point on the aircraft at 2, the aircraft being shown generally at 2a. Pivotally connected to the leg structure at 3 is a knuckle-jointed or articulated radius rod 3a which comprises a lower part 4 and an upper part 5 which are interconnected by an axle 6, the upper part 5 having its upper end pivotally connected to a portion of the aircraft 2a at 7. The pivot pins 2 and 7 are, of course, fixed points in the aircraft.

Figure 2:
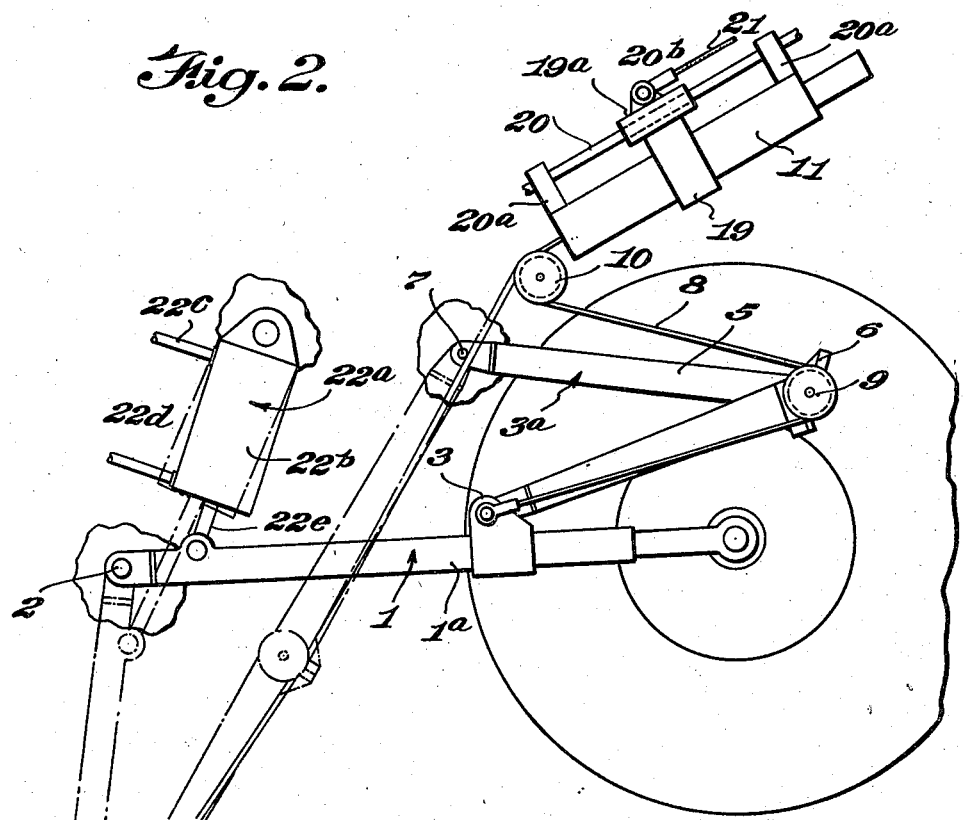
Figure 2 is an enlarged detail side elevation of my improved emergency extension mechanism as it would appear with the undercarriage in retracted position, the position of the mechanism when the undercarriage is extended being shown in dotted lines.
Figure 3:
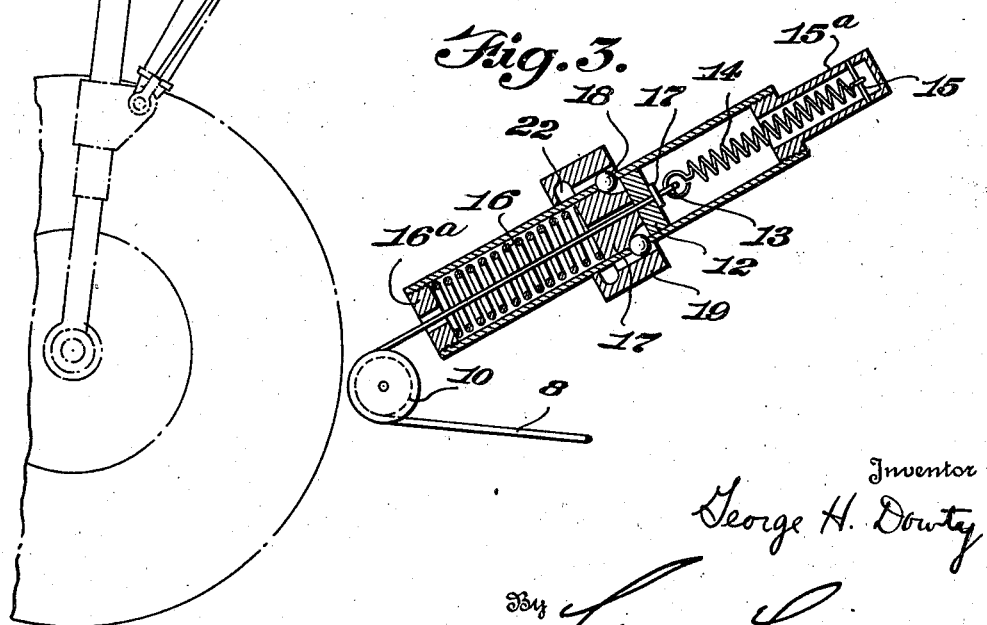
Figure 3 is an enlarged detail sectional view showing the structure of the cylinder.

In Figure 2 the undercarriage is shown in full lines retracted and in broken lines as it would appear in extended position. At the pivot point 3 there is attached one end of a cable 8 which is led over a pulley or fairlead 9 which is carried coaxially with the axle 6, and then over a pulley or fairlead 10 which is rotatably mounted within the aircraft 2a, and thence into a cylinder 11 which is fixedly mounted in the aircraft. As best seen in Figure 3, the inner, or upper, end of the cable 8 is disposed within the cylinder 11 and has mounted thereon a collar 12 which defines a stop, and an eye 13 in which engages the lower end of a relatively light tension spring 14, which spring is contained within the cylinder and has its opposite end anchored at 15 in an extension 15a of said cylinder 11.

Mounted in the cylinder 11 at the opposite end thereof from the spring 14, is a relatively strong compression spring 16 which is compressed between a plug 16a, at the lower end of the cylinder, and a tapered conical locking member 17 which normally bears against the lower surface of the collar or stop 12. As will be observed, the upper end of the cable 8 extends axially through the plug 16a through the coiled spring 16 and through the locking member 17 and the collar 12, said cable being anchored against displacement by a washer 17a which is disposed adjacent the eye 13.

Formed in the wall of the cylinder, substantially medially of its length, is a circumferentially disposed series of openings, and normally disposed in the openings is a series of locking balls 18. The locking balls 18 are normally held midway of the openings and against the tapered portion of the locking member 17 by the inner face of a release element 19 which is slidable on the outer surface of the cylinder. The release element 19, as best seen in Figure 2, includes a guide sleeve 19a which is slidable on a guide rod 20, said guide rod being disposed in parallel spaced relation to the cylinder and extending throughout the entire length of said cylinder and being held in spaced relation by brackets 20a. The sleeve 20 is formed with a yoke 20b and pivotally connected with said yoke is the lower end of a releasing cable 21. Formed in the release element 19 near one end is a circumferentially extending trough 22 which communicates with the inner face of the element and is of a size sufficient to accommodate the balls 18.

At 22a, in Figures 1 and 2, I have shown conventional mechanism for extending and retracting the undercarriage. This mechanism includes a cylinder 22b which is fed with fluid from a source of hydraulic pressure through pipes 22c and 22d. The mechanism also includes a piston rod 22e which has its lower end connected with the lower part 4 of the articulated radius rod 3.

Under normal conditions, when fluid is fed through the pipe 22c to the cylinder 22b, the piston in the cylinder will be advanced for urging the piston rod 22e downwardly for extending the undercarriage in the normal manner. Under these conditions, the spring 14 will take up any slack in the cable 8.

In the event that the mechanism 22a should fail to function, for any reason, it is only necessary for the pilot to give the releasing cable 21 a pull or jerk. When this takes place, the release element 19 will be shifted upwardly along the cylinder 11 until the trough 22 confronts the openings in said cylinder. When this position is reached by the element 19, the member 17 will, by pressure of the spring 16, cam the balls 18 into said trough 22. Camming the balls 18 into the trough 22 will, of course, release the member 17 to slide within the cylinder. Upon release of said member 17, the spring 16 will urge the member along the cylinder and against the tension of the relatively light spring 14. The collar 12 will also be shifted and as a result the cable 8 will be pulled upwardly within the cylinder for extending the undercarriage from the position shown in full lines in Figure 2 to that shown in broken lines.

It should be understood that the shape of the cylinder 11 and the particular arrangement of the locking means may be varied considerably without departing from the spirit of the invention. It should also be understood that, although I have shown the cylinder 11 as being mounted directly above the undercarriage, said cylinder may be remotely mounted if so desired.

It is desired particularly to call attention to the fact that but one movement on the part of the pilot is needed to bring my improved emergency extension mechanism into operation. That is to say, it is only necessary for the pilot to give the releasing cable 21 a single jerk, when the spring 16 will be brought into operation for raising the cable 8 and extending the undercarriage. It will be recognized that this is a particularly important feature of the invention when it is remembered that a pilot, depending upon the normal means of extension for his undercarriage, waits until his ship is about to land before letting down said undercarriage, in the interest of speed. When the pilot is about to land his ship, he has many duties to perform and, should the mechanism for extending the undercarriage normally fail to operate, he will have little time to give to operating other means of extension. The mechanism hereinabove described requires no further attention after the initial pull has been given to the releasing cable 21.

Having thus described the invention, what is claimed as new is:

1. In combination with a retractable aircraft undercarriage and conventional means completely operative in itself for extending the undercarriage, a completely independent emergency extending mechanism including a releasable source of stored, resilient energy, means operatively connecting the source of energy with the undercarriage, and means for releasing said source of energy for extending the undercarriage upon failure of the conventional means of extension, said last mentioned means including a cable for operation by the pilot.

2. In combination with a retractable undercarriage for aircraft, and conventional means completely operative in itself for extending the undercarriage, a completely independent undercarriage extending means, including a cylinder containing a source of energy, means operatively connecting the source of energy in the cylinder with the undercarriage and means connected with the cylinder and shiftable by a single movement for releasing the source of energy for emergency extension of the undercarriage.

3. In combination with a retractable undercarriage for aircraft, and conventional means completely operative in itself for extending the undercarriage, a completely independent emergency extension mechanism for quickly extending the undercarriage upon failure of the conventional means of extension, said emergency extension mechanism including a cylinder, a source of energy in the cylinder, means operatively connecting the source of energy with the undercarriage, a release member on the cylinder and shiftable for releasing the source of energy and extending the undercarriage, and means connected with said last mentioned means and engageable by the pilot for shifting said member.

4. In combination with a retractable undercarriage for aircraft, and conventional means completely operative in itself for extending the undercarriage, a completely independent emergency extension mechanism for quickly extending the undercarriage upon failure of the conventional means of extension, said emergency extension mechanism including a cylinder, a source of energy in the cylinder, means operatively connecting the source of energy with the undercarriage, a release member on the cylinder and shiftable for releasing the source of energy and extending the undercarriage, and means connected with said last-mentioned means and engageable by the pilot for shifting said member, said last mentioned means comprising a releasing cable connected with said release member.

GEORGE HERBERT DOWTY.

REFERENCES CITED

The following references are of record in the file of this patent:

UNITED STATES PATENTS

| Number | Name | Date |
|---|---|---|
| 1,922,371 | Jones | Aug. 15, 1933 |
| 2,180,462 | De Seversky | Nov. 21, 1939 |
| 2,001,620 | Levy | May 14, 1935 |

FOREIGN PATENTS

| Number | Country | Date |
|---|---|---|
| 460,316 | Great Britain | Jan. 26, 1937 |